Sept. 7, 1948.   T. O. HARKNESS   2,449,037
METHOD OF SEISMIC EXPLORATION OPERATIONS
Filed Nov. 30, 1945

TRAVIS O. HARKNESS
INVENTOR.

BY J. Vincent Martin
and
Ralph R. Browning
ATTORNEYS

Patented Sept. 7, 1948

2,449,037

UNITED STATES PATENT OFFICE 2,449,037

METHOD OF SEISMIC EXPLORATION OPERATIONS

Travis O. Harkness, Shreveport, La., assignor, by mesne assignments, to C. H. C. Patent Corporation, Texarkana, Tex., a corporation of Texas Application November 30, 1945, Serial No. 631,846

1 Claim. (Cl. 181—0.5)

1

This invention relates to improvements in methods and apparatus used in seismic exploration operations and refers more particularly to operations wherein explosives are detonated in a shot hole to send pulsations through the earth and the method of preparing the shot hole whereby the hole is not filled with debris after one or more shots.

In seismic exploration operations where pulsations or waves are created in the earth and recorded to determine the structure of the subsurface formations, it is customary to drill a hole in which an explosive charge is detonated. Heretofore these holes have been lined with pipe to prevent the filling of the hole with debris. In some instances the pipe has a closure at its lower end to assist in accomplishing this purpose. However, this method has not proven entirely satisfactory as in many instances the force of the explosion loosens the formations adjacent the lower end of the pipe causing the pipe to become filled with debris. The closure for the end of the pipe is shattered at the explosion point and is ineffective after the first shot.

It has been discovered that a shot hole pipe or casing having certain wall thickness and malleability characteristics will collapse inwardly adjacent an explosion at the bottom thereof to effectively close off its lower reaches so that it may be used for several shots.

An object of this invention is to provide a cased shot hole and method of preparing the same in which a portion of the pipe or casing adjacent the explosion will collapse inwardly to choke off or substantially close the pipe.

Another object of the invention is to provide a method and means for taking a series of shots at a given location.

Still another object is to provide a shot hole that will not fill with debris when explosives are detonated in its lower reaches.

Other and further objects of this invention will be apparent from the following description.

In the accompanying drawings which form a part of the instant specification, and are to be read in conjunction therewith and wherein like reference numerals are used to indicate like parts in the various views.

2

Figure 1:
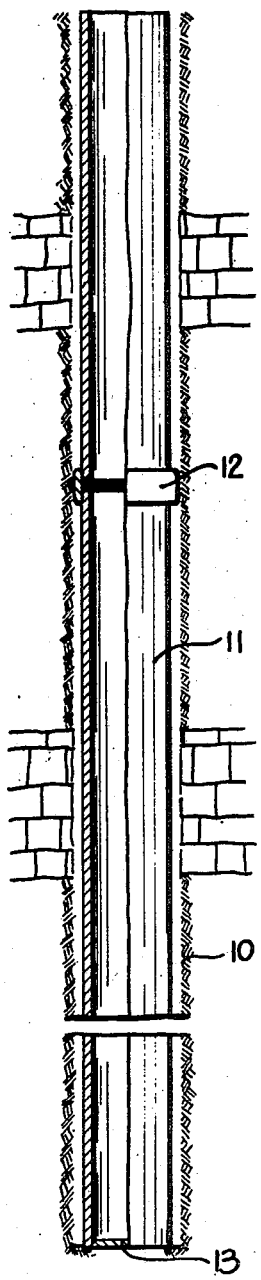
Fig. 1 is a sectional view of the lower portion of a shot hole.

Referring to the drawings, the numeral 10 designates diagrammatically a drill hole in the upper stratas of the earth. A pipe 11 is placed within the hole and comprises a series of joints coupled together by collars 12 having threaded connections therewith. The bottom of the pipe has a closure 13 preventing the filling of the pipe with gravel, sand and other debris. The pipe shown in this embodiment of the invention has an outside diameter of 3" and a wall thickness or gauge of 1/16". The pipe of this embodiment is made of relatively malleable steel. However, this example is given by way of illustration only and not by way of limitation. The wall thickness and the material from which the pipe is made are subject to variation, but must be proportioned in such manner that a portion of the pipe adjacent an explosion will collapse inwardly to substantially close off the pipe, preventing the inroad of debris. When steel pipe is used the wall thickness will preferably be within the limits of .055 inch and .075 inch.

Figure 2:
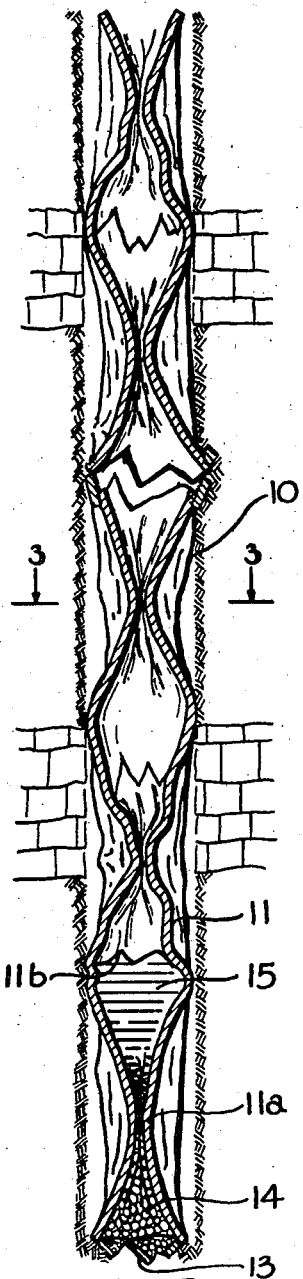
Fig. 2 is a sectional view of a lower portion of the shot hole shown in Fig. 1 after a series of explosions.

In Fig. 2 the pipe 11 is illustrated subsequent to detonation of a series of explosives therein. The first explosive charge is detonated at the bottom of the pipe and as illustrated the bottom closure 13 is shattered. The portion of the pipe adjacent the first explosion is collapsed inwardly, as shown at 11a, and serves to substantially close the lower end of the pipe preventing the inroad of gravel, sand and other debris. The debris collects in the flared lower end of the pipe, as shown at 14. While the closure serves to effectively close the pipe against solid particles, the closure is not an effective seal and fluids do enter the shattered end of the pipe. These fluids pass the collapsed portion 11a and rise to some level, as indicated at 15. The next explosive charge is placed in the pipe above the collapsd portion 11a and its detonation causes the portion of pipe above and adjacent the explosion to collapse again closing off the pipe to prevent the inroad of debris. The second charge usually causes a shattering or perforation of the pipe, as shown at 11b. Successive charges are then detonated as desired and in the drawings there is illustrated a shot hole in which five charges have been detonated.

Figure 3:
Fig. 3 is a view taken along the line 3—3 in Fig. 2 in the direction of the arrows.

The manner in which the pipe collapses adjacent the explosion is best illustrated in the transverse sectional view of Fig. 3. This collapsed portion varies in length with each explosion but usually is confined within the limits of one to four feet.

It is believed that the operation of this invention is obvious from the foregoing description. The hole 10 is drilled in the earth in any conventional manner and in practice usually varies in depth from 80 to 300 feet, but in some instances is even outside these limits, depending upon the requirements of the particular area being tested. The pipe is placed in the hole in a conventional manner and the first charge is placed in the closed lower end of the pipe. Usually water is placed over the charge to obtain a tamping effect. This charge on detonation shatters the lower end of the pipe and causes the portion of the pipe adjacent and above the shot to collapse inwardly. Successive charges as needed are then detonated, each charge collapsing the portion of the pipe above and adjacent the shot. Thus after each shot the pipe is closed to prevent its filling with debris. While this phenomena is not understood it has been discovered that it does exist and it is to these results that this invention pertains.

It will be seen that the objects of this invention have been accomplished. There has been provided a method and means for detonating explosive charges in seismic explorations wherein the shot hole is closed in its lower reaches by each explosion to prevent its filling with debris. The construction is such that a single or a series of successive shots may be had without the shot hole becoming filled with debris. It will also be appreciated that the lightness of the pipe which may be used in practicing this invention will be an advantage and result in the saving of materials and labor.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

What is claimed is:

A method of creating pulsations in the earth in seismic exploration operations comprising the steps of drilling a hole in the earth, setting a relatively malleable steel pipe having a gauge within the limits of .055 inch and .075 inch in the hole and detonating an explosive charge in the lower reaches of the pipe whereupon the pipe will collapse inwardly adjacent the explosion substantially closing the pipe.

TRAVIS O. HARKNESS.

REFERENCES CITED

The following references are of record in the file of this patent:

UNITED STATES PATENTS

| Number | Name | Date |
| --- | --- | --- |
| 1,106,606 | Wilhelmi | Aug. 11, 1914 |
| 2,272,741 | Failing | Feb. 10, 1942 |
| 2,384,851 | Reichert | Sept. 18, 1945 |